US007949638B1

(12) United States Patent
Goodson et al.

(10) Patent No.: US 7,949,638 B1
(45) Date of Patent: May 24, 2011

(54) SYSTEM AND METHOD FOR NEARLY IN-BAND SEARCH INDEXING

(75) Inventors: Garth Richard Goodson, Fremont, CA (US); Shankar Pasupathy, Sunnyvale, CA (US)

(73) Assignee: NetApp, Inc., Sunnyvale, CA (US)

(*) Notice: Subject to any disclaimer, the term of this patent is extended or adjusted under 35 U.S.C. 154(b) by 0 days.

(21) Appl. No.: 12/750,137

(22) Filed: Mar. 30, 2010

Related U.S. Application Data

(63) Continuation of application No. 11/590,381, filed on Oct. 31, 2006, now Pat. No. 7,720,889.

(51) Int. Cl.
  *G06F 7/00* (2006.01)
  *G06F 17/00* (2006.01)
(52) U.S. Cl. ........ 707/655; 707/715; 707/741; 707/809; 711/150; 711/162
(58) Field of Classification Search .................. 707/655, 707/715, 741, 809; 711/150, 162
  See application file for complete search history.

(56) References Cited

U.S. PATENT DOCUMENTS

| | | |
|---|---|---|
| 4,570,217 A | 2/1986 | Allen et al. |
| 5,124,987 A | 6/1992 | Milligan et al. |
| 5,163,131 A | 11/1992 | Row et al. |
| 5,202,979 A | 4/1993 | Hillis et al. |
| 5,278,979 A | 1/1994 | Foster et al. |
| 5,403,667 A | 4/1995 | Simoens |
| 5,581,724 A | 12/1996 | Belsan et al. |
| 5,819,292 A | 10/1998 | Hitz et al. |
| 6,009,481 A | 12/1999 | Mayer |
| 6,061,770 A | 5/2000 | Franklin |
| 6,081,875 A | 6/2000 | Clifton et al. |
| 6,341,341 B1 | 1/2002 | Grummon et al. |
| 6,549,992 B1 * | 4/2003 | Armangau et al. ........... 711/162 |
| 6,636,908 B1 | 10/2003 | Winokur et al. |
| 6,636,981 B1 | 10/2003 | Barnett et al. |
| 6,707,818 B1 | 3/2004 | Kadambi et al. |
| 6,735,636 B1 | 5/2004 | Mokryn et al. |
| 6,751,219 B1 | 6/2004 | Lipp et al. |
| 6,993,027 B1 * | 1/2006 | Kadambi et al. .............. 370/394 |
| 7,028,218 B2 * | 4/2006 | Schwarm et al. ............... 714/11 |
| 7,107,273 B2 | 9/2006 | Ohata et al. |
| 7,127,577 B2 | 10/2006 | Koning et al. |
| 7,227,862 B2 * | 6/2007 | Kalkunte et al. .............. 370/389 |
| 7,293,005 B2 * | 11/2007 | Fontoura et al. ............. 707/741 |
| 7,310,332 B2 | 12/2007 | Kadambi et al. |
| 7,340,639 B1 | 3/2008 | Lee et al. |

(Continued)

OTHER PUBLICATIONS

Taking Baselines—Honeypots for windows, 2005—SprinerLink—"Honeypot Monitoring" 2005, Part Three, (pp. 269-300).*

(Continued)

*Primary Examiner* — Jean B. Fleurantin
*Assistant Examiner* — Anh Ly
(74) *Attorney, Agent, or Firm* — Cesari and McKenna, LLP

(57) ABSTRACT

A system and method for nearly in-band search indexing. A network switch (or other intermediate network device) is configured to provide port mirroring so that data access requests directed to a storage system are forwarded to both the storage system and to a search appliance. The search appliance collects index information from the received data access requests to update a search index. As the search appliance is nearly in-band, i.e., not directly in-line of the data access request path, no increase of latency occurs for processing data access requests by the storage system.

20 Claims, 4 Drawing Sheets

U.S. PATENT DOCUMENTS

| | | | |
|---|---|---|---|
| 7,409,494 | B2 | 8/2008 | Edwards et al. |
| 7,440,467 | B2 | 10/2008 | Gallatin et al. |
| 7,484,058 | B2 * | 1/2009 | Frey et al. ............... 711/162 |
| 7,491,948 | B2 | 2/2009 | Gordon |
| 7,617,365 | B2 | 11/2009 | Zhang et al. |
| 7,693,864 | B1 * | 4/2010 | Pasupathy et al. ..... 707/999.102 |
| 7,783,689 | B2 * | 8/2010 | Richardson et al. ........ 707/741 |
| 2002/0034187 | A1 * | 3/2002 | Kalkunte et al. ............ 370/401 |
| 2004/0030668 | A1 | 2/2004 | Pawlowski et al. |
| 2004/0174898 | A1 | 9/2004 | Kadambi et al. |
| 2005/0246504 | A1 * | 11/2005 | Frey et al. ............... 711/150 |
| 2005/0271065 | A1 | 12/2005 | Gallatin et al. |
| 2006/0010299 | A1 * | 1/2006 | Zhang et al. ............. 711/162 |
| 2006/0242212 | A1 | 10/2006 | Brinkmann et al. |
| 2006/0265497 | A1 | 11/2006 | Ohata et al. |
| 2007/0094465 | A1 * | 4/2007 | Sharma et al. ............ 711/162 |
| 2007/0094466 | A1 * | 4/2007 | Sharma et al. ............ 711/162 |
| 2008/0021902 | A1 | 1/2008 | Dawkins et al. |
| 2008/0127348 | A1 * | 5/2008 | Largman et al. ............ 726/24 |

OTHER PUBLICATIONS

E. Anderson and M. Arlitt—"Full Packet Capture and Offline Analysis on 1 and 10 Gb/s Networks"—HP laboratories Palo Alto, Nov. 1, 2006 (pp. 1-15).*

Aguilera et al.—"Performance Debugging for Distributed systems of Black Boxes"—Proceddings of the conference 2003, ACM SOSP'03 Oct. 19-22, 2003 (pp. 74-89).*

Akyurek, Sedat, *Placing Replicated Data to Reduce Seek Delays*, Department of Computer Science, University of Maryland, UMIACS-TR-91-121, CS-TR-2746, Aug. 1991.

Bitton, Dina, *Disk Shadowing*, Proceedings of the 14$^{th}$ VLDB Conference, LA, CA 1988.

Chaudhuri, Surajit, et al., *Self-Tuning Technology in Microsoft SQL Server*, Data Engineering Journal 22, 2 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kent, Jack et al., *Optimizing Shadow Recovery Algorithms*, IEEE Transactions on Software Engineering, 14(2): 155-168, Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, Feb. 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, Feb. 1999 pp. 28-32.

Weikum, Gerhard, et al., *Towards Self-Tuning Memory Management for Data Servers*, Data Engineering Journal 22, Feb. 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

"The software architecture of a SAN storage control system"—Gilder et al.—IBM Systems Journal vol. 42, No. 2, 2003 (pp. 232-249).

"Retrieval efficiency in peer-to-peer networks with replication restrictions"—Klamanos et al.—Database and expert systems applications, 2005, proceedings, 16$^{th}$ International workshop, date Aug. 22-26, 2005 (pp. 758-763).

"HyperSpector: Virtual Distributed Monitoring Environments for Secure Instruction Detection"—Kenichi Kourai and Shigeri Chiba—ACM 2005 (Jun. 11-12, 2005) (pp. 197-207).

\* cited by examiner

\# SYSTEM AND METHOD FOR NEARLY IN-BAND SEARCH INDEXING

CROSS-REFERENCE TO RELATED APPLICATIONS

The present application is a continuation of commonly assigned Ser. No. 11/590,381, filed Oct. 31, 2006 now U.S. Pat. No. 7,720,889, issue on May 18, 2010, by Garth Richard Goodson for a SYSTEM AND METHOD FOR NEARLY IN-BAND SEARCH INDEXING and is hereby incorporated by reference.

FIELD OF THE INVENTION

The present invention relates to storage systems and, more specifically, to updating search index information associated with data served by storage systems.

BACKGROUND OF THE INVENTION

A storage system typically comprises one or more storage devices into which information may be entered, and from which information may be obtained, as desired. The storage system includes a storage operating system that functionally organizes the storage system by, inter alia, invoking storage operations in support of a storage service implemented by the system. The storage system may be implemented in accordance with a variety of storage architectures including, but not limited to, a network-attached storage (NAS) environment, a storage area network (SAN) and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of data containers, such as directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system organizes the data blocks within the vbn space as a "logical volume"; each logical volume may be, although is not necessarily, associated with its own file system. The file system typically consists of a contiguous range of vbns from zero to n, for a file system of size n+1 blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., of Sunnyvale, Calif.

The storage system may be configured to operate according to a client/server model of information delivery to thereby allow many clients to access the directories, files and blocks stored on the system. In this model, the client may comprise an application, such as a database application, executing on a computer that "connects" to the storage system over a computer network, such as a point-to-point link, shared local area network, wide area network or virtual private network implemented over a public network, such as the Internet. Each client may request the services of the file system by issuing file system protocol messages (in the form of packets) to the storage system over the network. By supporting a plurality of file system protocols, such as the conventional Common Internet File System (CIFS) and the Network File System (NFS) protocols, the utility of the storage system is enhanced.

Storage system users often desire to search the data containers stored within storage systems to identify those containers that contain one or more search criteria, such as phrases and terms. As noted, data containers may include a file, a directory, a virtual disk (vdisk), or other data construct that is addressable via a storage system. For example, a user may desire to search and locate all data containers serviced by the storage system that contain the phrase "Accounts Receivable." By enabling searching of data containers on storage systems, users may make better utilization of their data, especially in large enterprises where the number of data containers may be in the tens or hundreds of millions.

To identify data containers that meet the search criteria, a search process may need to examine all of the data containers within a storage system every time a search is requested. In a typical storage system, having tens or hundreds of millions of data containers, this is not a practical solution due to the substantial amount of time required to access every data container to determine if it contains the search criteria. To enable faster searching, a search index of information associated with the data containers may be generated for the storage system. The storage system search index may be constructed by performing a file system "crawl" through the entire file system (or other data container organizational structure) serviced by the storage system. Typically, a file system crawl involves accessing every data container within the file system to obtain the necessary index information. However, such a file system crawl is expensive both in terms of disk input/output operations and processing time, and suffers from the same practical problems of directly accessing each data container. That is, the file system crawl may slow access to the file system for tens of minutes at a time, which results in an unacceptable loss of performance.

Furthermore, the file system crawl must be performed at regular intervals to maintain up-to-date index information. As a result of the substantial processing time required, a further disadvantage of the file system crawl is that the search index information may be inconsistent with the current state of the file system, i.e., the index information only represents the file system as of the completion of the last file system crawl.

One technique for improving search indexing capabilities is to utilize a search appliance operatively interconnected between a storage system and clients of the storage system. As used herein a search appliance denotes a computer executing indexing and/or searching software for use in preparing search indices of data containers served by a storage system and/or for executing searches on the data containers. Illustratively, the search appliance executes indexing software that monitors data access requests as they flow through the search appliance to the storage system. By monitoring the data containers modified by the data access requests, the indexing software identifies which data containers should be retrieved from the storage system to update the index information, thereby obviating in the need for a full file system crawl.

Such a prior art storage system and search appliance environment 100 is shown in FIG. 1. One or more clients 105, which may comprise personal computers or other computers desiring access to the storage system 120, are interconnected with a search appliance 115, which is operatively interconnected with storage system 120. The search appliance is thus "in line" (or in-band) with the storage system 120 and clients 105. Coupled to the storage system 120 is a set of data storage devices 125, such as disks. In operation, a client 105 transmits a data access request to the search appliance 115, which examines the request and performs appropriate indexing operations before forwarding the request to the storage system 120 for processing. The search appliance 115 thus operates as a proxy for the storage system 120.

A noted disadvantage of such an environment 100 is that the search appliance 115 must perform indexing operations in real-time, i.e., as data access requests flow through to the storage system. Since all data access requests must flow through the in-band search appliance 115, there is an additional increase in processing latency of the requests, which may result in an unacceptable level of performance. A further noted disadvantage is the possibility that the search appliance 115 may modify the data access requests or otherwise interject error conditions into data flowing to/from the storage system 120, thereby resulting in data corruption and/or data loss. Additionally, an in-band search appliance presents a single point of failure, i.e., if the search appliance fails, then the sole data path between the client and a storage appliance is lost. Furthermore, another noted disadvantage of in-band search appliances is that they must be as robust as the supporting storage system as all data access requests flow through the search appliance. Any faults of protocol implementation in the search appliance may result in data corruption on the storage system.

SUMMARY OF THE INVENTION

The present invention overcomes the disadvantages of the prior art by providing a system and method for nearly in-band search indexing. A search appliance is operatively interconnected with a first port of a network switch (or other intermediate networking device) and a storage system is operatively interconnected with a second port of the switch. Clients may be interconnected with the other ports of the switch. The network switch is then configured to perform port mirroring, i.e., to forward data access requests directed to the storage system to the port associated with the search appliance in addition to the port associated with the storage system. Thus, in response to receiving a data access request directed to the storage system, the switch forwards the request to both the first port connected to the search appliance and the second port connected to the storage system.

An indexing process executing on the search appliance may then examine the "mirrored" data access requests to collect relevant search index information while the storage system services those requests in parallel. Furthermore, the indexing process may buffer the data access requests so that they do not need to be processed in real time. The collected search index information may be utilized to identify those data containers that should be examined for modified content. For example, the index information may identify a list of data containers that have been modified within a certain time period. At regular intervals, the indexing process may scan the modified data containers on the storage system to update the search index. Alternately, the indexing process may cooperate with a searching process executing on the appliance to perform a limited file system scan to update the index information relating to the modified data containers.

By utilizing port minoring, no additional latency is added while servicing data access requests by the storage system. Additionally, the search appliance is not directly in-line with the data flow between the clients and the storage system. Thus, there is no possibility of the search appliance modifying or corrupting data written to/read from the storage system. Another advantage of a nearly in-band search appliance is that it is not a single point of failure, should a nearly in-band search appliance fail, there is still a data path to the storage system. Additionally, upon reinitialization, the nearly in-band search appliance may begin servicing data while initiating a background scan of the storage system to index any data containers that were updated while the search appliance was inoperative.

In an alternate embodiment, the novel nearly in-band search indexing system and method may be utilized in a virtual machine environment. Here, a storage operating system, which functionality organizes a storage system, executes within a first virtual machine while indexing and/or search processes execute within a second virtual machine. Virtual machine management software is configured so that data access requests received at a physical computer, such as a storage system, executing the virtual machines and directed to network addresses associated with the first virtual machine are forwarded to both the first and second virtual machines. In this way, out-of-band search indexing may occur within the single physical computer.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
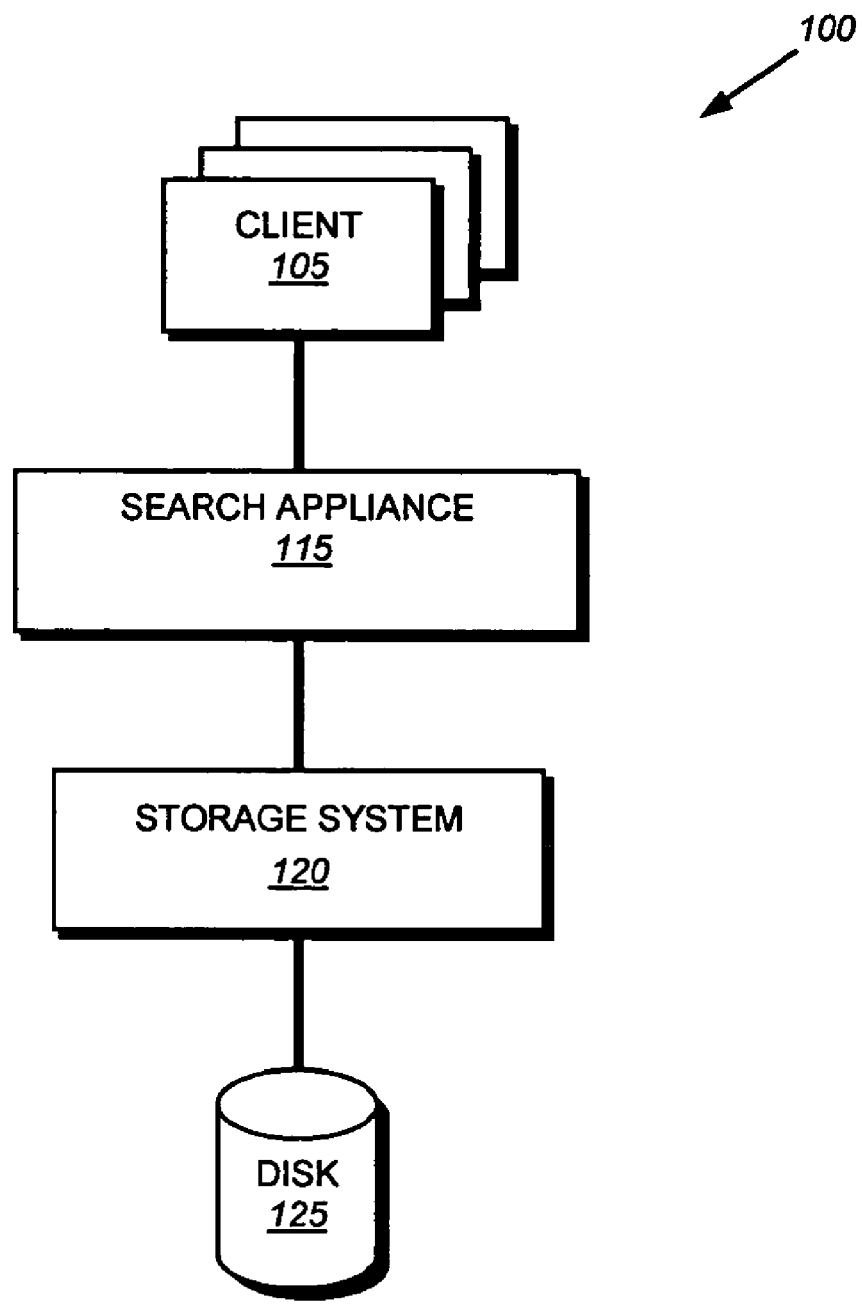
FIG. 1, previously described, is a schematic block diagram of an in-band search appliance environment.

The present invention provides a system and method for nearly in-band search indexing. By nearly in-band it is meant that a copy of the data stream is received by the search appliance, similar to an in-band arrangement; however, the search appliance is not in the direct data path between a client and the storage system, similar to an out of band arrangement. A search appliance is operatively interconnected with a first port of a network switch (or other intermediate networking device) and a storage system is operatively interconnected with a second port of the switch. Clients may be interconnected with the other ports of the switch. The network switch is then configured to perform port mirroring, i.e., to forward data access requests directed to the storage system to the port associated with the search appliance in addition to the port associated with the storage system. Thus, in response to receiving a data access request addressed to the storage system, the switch forwards the data access request to both the first port servicing the search appliance and the second port servicing the storage system.

An indexing process executing on the search appliance may then examine the "mirrored" data access requests to collect relevant search index information while the storage system services those requests in parallel. Furthermore, the indexing process may buffer the data access requests so that they do not need to be processed in real time. The collected search index information may be utilized to identify those data containers that should be examined for modified content. For example, the index information may identify a list of data containers that have been modified within a certain time period. At regular intervals, the indexing process may scan the modified data containers on the storage system to update the search index. Alternately, the indexing process may cooperate with a searching process executing on the appliance to perform a limited file system scan to update the index information relating to the modified data containers.

By utilizing port mirroring, no additional latency is added while servicing data access requests by the storage system. Additionally, the search appliance is not directly in-use with the data flow between the clients and the storage system. Thus, there is no possibility of the search appliance modifying or corrupting data written to/read from the storage system. Another advantage of a nearly in-band search appliance is that it is not a single point of failure, should a nearly in-band search appliance fail, there is still a data path to the storage system. Additionally, upon reinitialization, the nearly in-band search appliance may begin servicing data while initiating a background scan of the storage system to index any data containers that were updated while the search appliance was inoperative.

In an alternate embodiment, the nearly in-band search indexing system and method may be utilized in a virtual machine environment. Here, a storage operating system, which functionality organizes a storage system, executes within a first virtual machine while indexing and/or search processes execute within a second virtual machine. Virtual machine management software is configured so that data access requests received at a physical computer, such as a storage system, executing the virtual machines and directed to network addresses associated with the first virtual machine are forwarded to both the first and second virtual machine(s). In this way, out-of-band search indexing may occur within the single physical computer.

Figure 2:
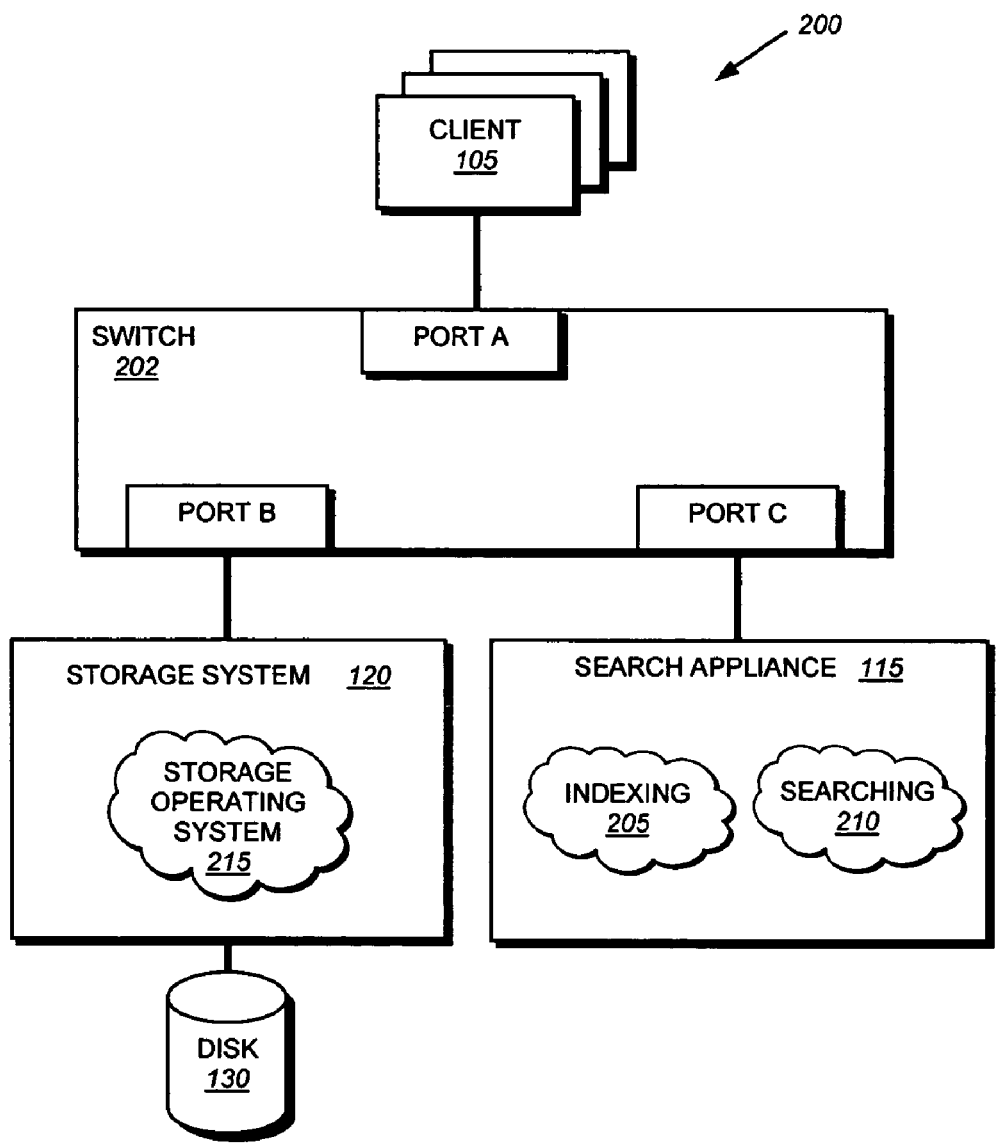
FIG. 2 is a schematic block diagram of an exemplary network environment illustrating nearly in-band search indexing using port mirroring in accordance with an embodiment of the present invention.

FIG. 2 is a schematic block diagram of an exemplary network environment 200 in which the principles of the present invention may be implemented. A client 105 is operatively interconnected with a switch 202 (or other intermediate network device) via Port A of the switch, while a storage system 120 is operatively interconnected with the switch 202 via Port B. The storage system 120 illustratively includes a storage operating system 215 that processes data access requests directed to the storage system and stores/retrieves data to/from storage devices, such as disks 130. An exemplary storage operating system is the Data ONTAP® storage operating system available from Network Appliance, Inc. of Sunnyvale, Calif. The Data ONTAP® storage operating system is further described in U.S. Pat. No. 7,693,864, issued on Apr. 6, 2010, entitled SYSTEM AND METHOD FOR QUICKLY DETERMINING CHANGED METADATA USING PERSISTENT CONSISTENCY POINT IMAGE DIFFERENCING, by Shankar Pasupathy, et al.

A search appliance 115 is also operatively interconnected with the switch 202 via Port C. The switch 202 may be a TCP/IP transport medium based switch or, in alternate embodiments, may be Fibre Channel (FC) based. It should be noted that in alternate embodiments of the present invention, the switch 202 may utilize any transport medium. As such, the description of switch 202 utilizing TCP/IP and/or FC should be taken as exemplary only. Furthermore, while this description is written in terms of switch 202, the principles of the present invention may be utilized with any intermediate network device capable of port mirroring as described below. As such, the term "switch" should be taken as exemplary only and should include any acceptable intermediate network device.

The search appliance 115 is illustratively embodied as a computer executing specialized searching software, which illustratively includes indexing process 205 and/or searching process 210. The indexing process 205 examines received data access requests that are mirrored to the search appliance 115 in accordance with the present invention and extracts relevant search index information. The searching process 210 implements a searching capability available to users of the search appliance 115. That is, the searching process 210 enables users to locate data containers containing user-defined search criteria including, for example, search terms, phases, modification dates, etc. The searching process 210 may implement well-known searching techniques, such as those available from Google, Inc. of Mountain View, Calif. or Kazeon, Inc. of Mountain View, Calif.

The client 105 may be a general-purpose computer configured to execute applications thereon. Moreover, the client 105 may interact with the storage system 120 in accordance with a client/server model of information delivery. That is, the client may request the services of the storage system 120, and the storage system 120 may return results of the services requested by the client, by exchanging packets via the switch 202. The client may issue packets including a file-based access protocols, such as the Common Internet File System (CIFS) protocol or the Network File System (NFS) protocol, over TCP/IP when accessing information in the form of files and directories. Alternately, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Figure 3:
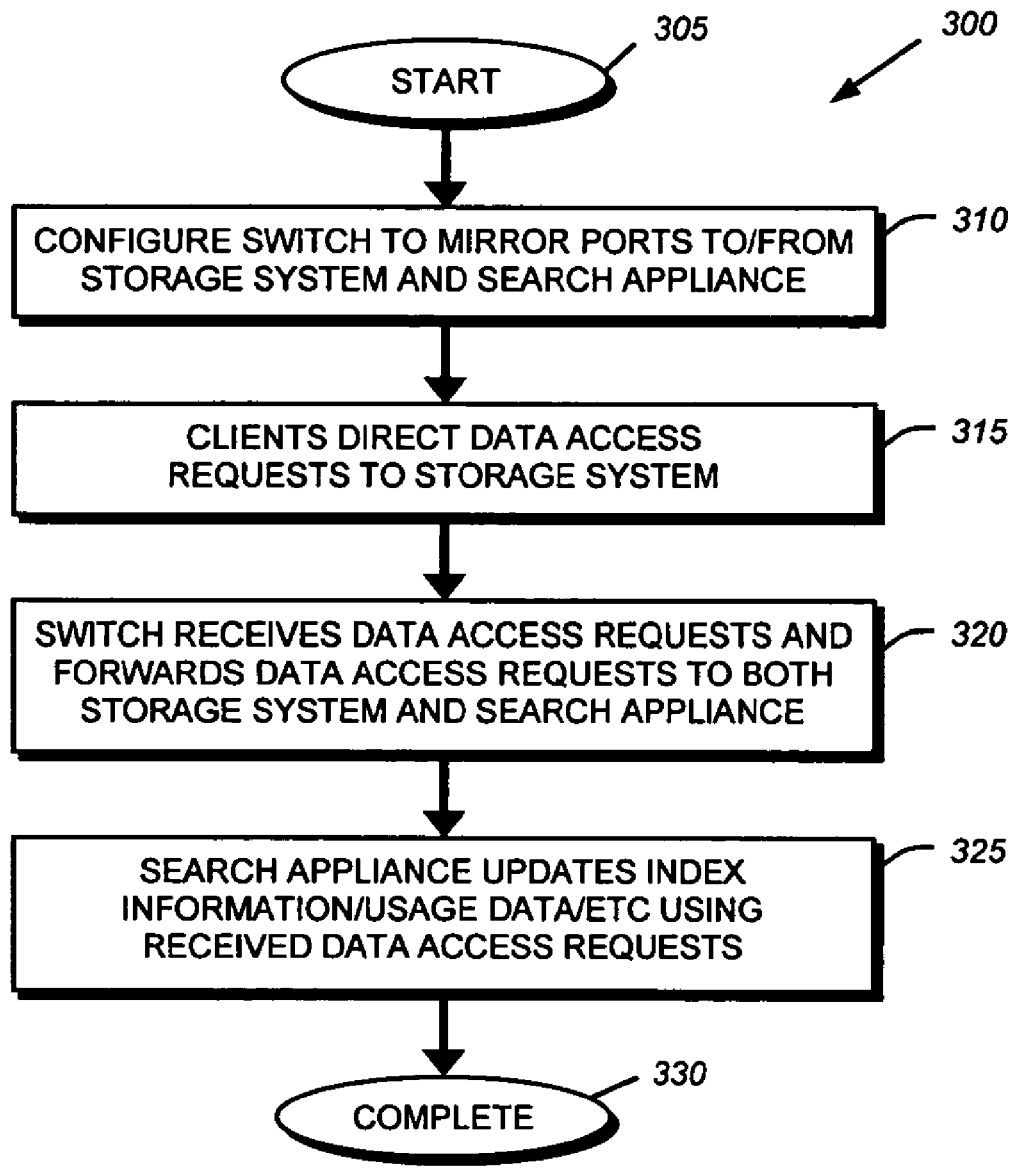
FIG. 3 is a flowchart detailing the steps of a procedure for nearly in-band search indexing in accordance with an embodiment of the present invention.

FIG. 3 is a flowchart detailing the steps of a procedure 300 for performing nearly in-band search indexing in accordance with an embodiment of the present invention. The procedure 300 begins in step 305 and continues to step 310 where an administrator configures the network switch to perform port mirroring to the storage system and the search appliance. This configuration may be performed by using conventional network switch configuration utilities for switches that support port mirroring operations. That is, the network switch 202 is configured so that any data access request received by the switch to be forwarded over a port associated with the storage system is also mirrored (i.e., forwarded) to the port associated with the search appliance. As noted above, the present invention may be utilized with any intermediate network device capable of performing port mirroring. As switches are typically capable of performing port mirroring with minimal additional latency, data access requests directed to the storage system will be received with no appreciable delay as compared to the prior art in band arrangement.

Once the switch has been configured, clients may direct data access requests to the storage system in step 315. In response to receiving the data access requests, the switch forwards those requests to both the storage system and the search appliance in step 320. It should be noted that in alternate embodiments, a plurality of storage systems may be associated with a search appliance. In such embodiments, a data access request directed to any of the storage systems is forwarded by the switch to both the destination storage system and the search appliance. Accordingly, the switch may perform a plurality of port mirroring operations.

In the exemplary embodiment shown in FIG. 2, a client 105 directing a request to storage system 120 forwards the data access request to the switch 202. The data access request is received at Port A of the switch 202 and is forwarded over both ports B and C so that both the storage system 120 and search appliance 115 receive a copy of the request. In step 325, the search appliance 115 updates its search indexing information using the received data access requests. The index information may comprise, for example, a list of data containers that have been modified by data access requests, the time of modification, access times, etc. Typically, the searching process 210 or, in certain embodiments, the indexing process 205 itself, will utilize the search index information to determine which data containers should be scanned to update the overall search index. As only a subset of the data containers serviced by the storage system is scanned, the disadvantages of performing an entire file system crawl are obviated.

In certain embodiments, the search appliance 115 also monitors responses from the storage system 120 to clients to determine which data containers should be scanned to update the overall search index. For example, if a WRITE operation is directed to a data container, but an error message is returned from the storage system to the client, then the data container has not been modified and there is no need to update indexing information regarding it. If the search appliance does not monitor the responses, then this data container would be added to the list to be rescanned, thereby increasing the number of data containers to be rescanned to update the indexing information.

Furthermore, in certain embodiments, the indexing process 205 may update the search index directly based on the received data access requests without requiring an additional scan of the modified data containers. Such embodiments may occur when, for example, the search index is based on metadata and not user data of the data containers. Metadata indexing may be utilized to track the amount of free space in a file system, the largest data containers in a system, etc. The procedure 300 then completes in step 330.

Figure 4:
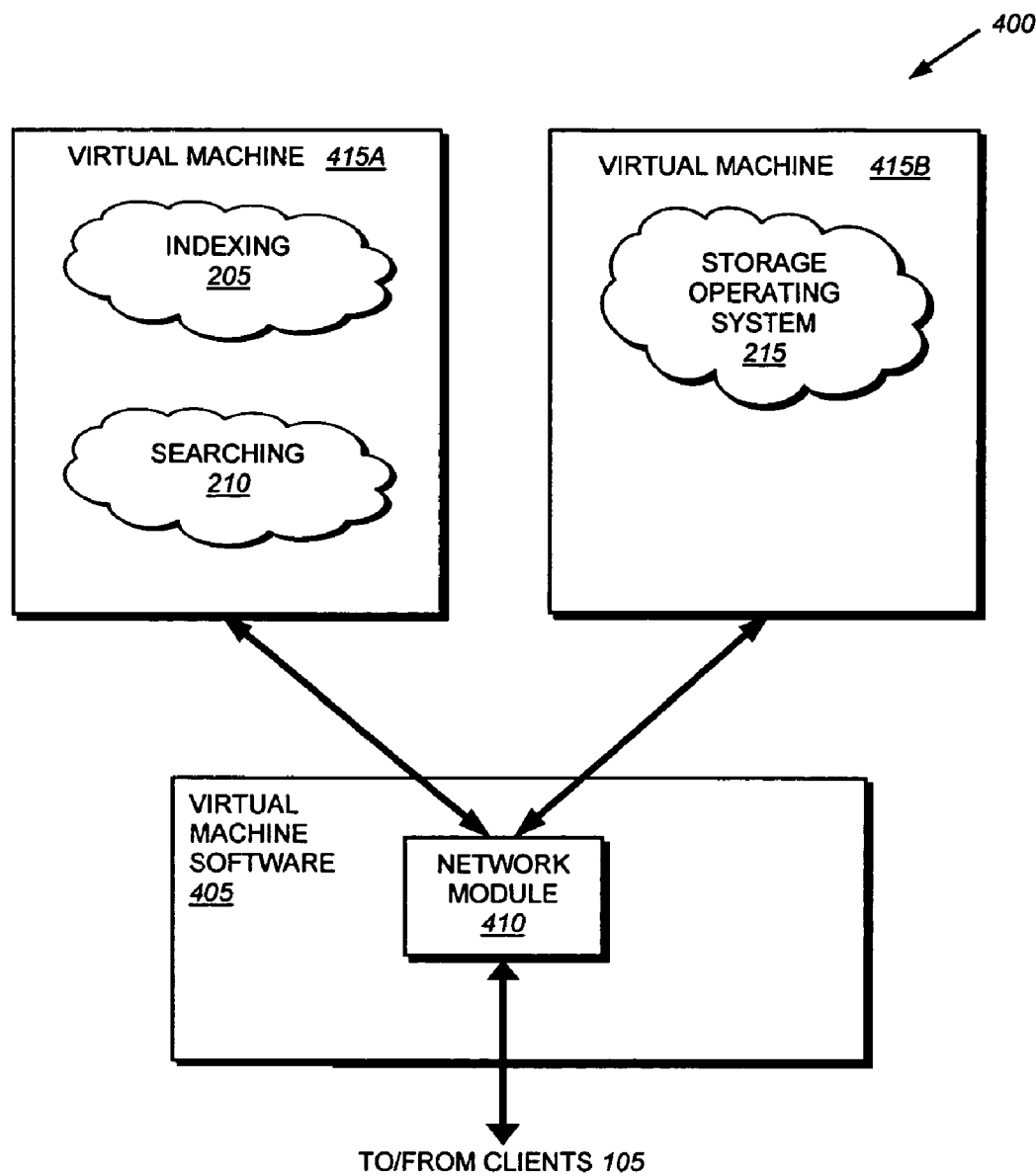
FIG. 4 is a schematic block diagram of an exemplary virtual machine environment illustrating nearly in-band search indexing in accordance with an embodiment of the present invention.

FIG. 4 is a schematic block diagram of an exemplary environment 400 showing an alternate embodiment of the present invention utilizing nearly in-band search indexing in a virtual machine environment. Illustratively, the virtual machine environment 400 includes a virtual machine management software module 405 that implements a plurality of virtual machines 415 within a physical computer, such as a storage system. In accordance with an exemplary embodiment, a first virtual machine 415A executes indexing process 205 and/or searching process 210 whereas a second virtual machine 415B executes a storage operating system 215. As noted above, the storage operating system 215 functionality organizes the storage system.

A network module 410 of the virtual machine management software 405 manages network protocols and distribution of data access requests to/from clients 105. In accordance with the illustrative embodiment, the network module 410 performs the functionality of an intermediate network device and may be modified to provide virtual port mirroring by forwarding received data access requests to a plurality of virtual machines. In the exemplary environment 400, the network module 410 is configured so that data access requests received from clients 105 are forwarded to both the virtual machine 415B executing the storage operating system 215 as well as the virtual machine 415A executing the indexing and/or search processes 205,210. It should be noted that in alternate embodiments additional virtual machines may be executing within the virtual machine environment 400. In such environments the network module 410 may be modified to forward data access requests to any number of virtual machines.

Alternately, if there are a plurality of virtual machines executing storage operating systems, the network module 410 may be configured so that data access requests directed to any number of such virtual machines are forwarded to a single virtual machine executing indexing and/or searching processes. Thus, a single instantiate of the indexing process 205 executing on a virtual machine may provide for indexing a plurality of storage operating system instantiations.

The foregoing description has been directed to specific embodiments of this invention. It will be apparent, however, that other variations and modifications may be made to the described embodiments, with the attainment of some or all of their advantages. For instance, it is expressly contemplated that the teachings of this invention includes a non-transitory computer-readable medium having program instructions executing on a computer, hardware, firmware, or a combination thereof. Accordingly this description is to be taken only by way of example and not to otherwise the scope of the invention. Therefore, it is the object of the appended claims to cover all such variations and modifications as come within the true spirit and scope of the invention.

What is claimed is:

1. A method of performing search indexing in a virtual machine environment, the method comprising:
port mirroring, by an intermediate network device, a plurality of data access requests directed to a second port operatively connected to one or more virtual machines, wherein the port mirroring comprises forwarding the data access requests directed to the one or more virtual machines to a third port associated with a search appliance in addition to the second port associated with the one or more virtual machines;

executing, by a processor, a storage operating system in the one or more virtual machines; and executing an indexing process within the search appliance.

2. The method of claim 1, further comprising transmitting a selected one of the data access requests addressed to a first virtual machine of the one or more virtual machines to a network module.

3. The method of claim 2, further comprising forwarding, by the network module, the selected data access request to the one or more virtual machines for processing by the storage operating system executing thereon and to the search appliance for processing by the indexing process.

4. The method of claim 3, further comprising updating, by the indexing process, a set of index information using the forwarded data access request.

5. The method of claim 4, the set of index information further comprising an identifier of one or more data containers modified by the forwarded data access request.

6. The method of claim 4, further comprising buffering, by the indexing process, the forwarded data access request.

7. A non-transitory computer readable medium containing executable program instructions executed by a processor, comprising:

program instructions that port mirror, on an intermediate network device, a plurality of data access requests directed to a second port operatively connected to one or more virtual machines, wherein the port mirror comprises forwarding the data access requests directed to the one or more virtual machines to a third port associated with a search appliance in addition to the second port associated with the one or more virtual machines;

program instructions that execute a storage operating system in the one or more virtual machines; and program instructions that execute an indexing process within the search appliance.

8. The non-transitory computer readable medium of claim 7, further comprising program instructions that transmit a selected one of the data access requests addressed to a first virtual machine, to a network module.

9. The non-transitory computer readable medium of claim 8, further comprising program instructions that forward, by the network module, the selected data access request to the one or more virtual machines for processing by the storage operating system executing thereon and to the search appliance for processing by the indexing process.

10. The non-transitory computer readable medium of claim 9, further comprising program instruction that update, by the indexing process, a set of index information using the forwarded data access request.

11. The non-transitory computer readable medium of claim 10, the set of index information further comprising an identifier of one or more data containers modified by the forwarded data access request.

12. The non-transitory computer readable medium of claim 10, further comprising program instructions that buffer the forwarded data access request.

13. A system for performing search indexing in a virtual machine environment, the method comprising:

an intermediate network device configured to port mirror a plurality of data access requests directed to a second port operatively connected to one or more virtual machines, the port mirror configured to forward the data access requests directed to the one or more virtual machines to a third port associated with a search appliance in addition to the second port associated with the one or more virtual machines;

one or more virtual machines executing a storage operating system by a processor; and the search appliance executing an indexing process.

14. The system of claim 13, the intermediate network device configured to transmit a selected one of the data access requests addressed to a first virtual machine, to a network module.

15. The system of claim 14, the network module configured to forward the selected data access request to the one or more virtual machines for processing by the storage operating system executing thereon and to the search appliance for processing by the indexing process.

16. The system of claim 15, the indexing process configured to update a set of index information using the forwarded data access request.

17. The system of claim 16, the set of index information further comprising an identifier of one or more data containers modified by the forwarded data access request.

18. The system of claim 16, the indexing process further configured to buffer the forwarded data access request.

19. A method of performing search indexing in a virtual machine environment, the method comprising:

executing, by a processor, a storage operating system in one or more virtual machines executing an indexing process within a search appliance;

port mirroring, by an intermediate network device, a plurality of data access requests directed to a second port operatively connected to the one or more virtual machines, wherein the port mirroring comprises forwarding the data access requests directed to the one or more virtual machines to a third port associated with the search appliance in addition to the second port associated with the one or more virtual machines; and examining the port mirrored data access requests to collect relevant search index information while the one or more virtual machines service the port mirrored data access requests in parallel.

20. The system of claim 19, further comprising, buffering, by the indexing process, the forwarded data access requests.

* * * * *

UNITED STATES PATENT AND TRADEMARK OFFICE
CERTIFICATE OF CORRECTION

PATENT NO. : 7,949,638 B1  
APPLICATION NO. : 12/750137  
DATED : May 24, 2011  
INVENTOR(S) : Garth Richard Goodson Page 1 of 1

It is certified that error appears in the above-identified patent and that said Letters Patent is hereby corrected as shown below:

In Col. 4, line 24:
By utilizing port ~~minoring~~ mirroring, no additional latency is added In Col. 7, line 15:
capable of performing port ~~minoring~~ mirroring. As switches are typi- In Col. 7, line 30:
perform a plurality of port ~~minoring~~ mirroring operations.

In Col. 8, line 22:
may be modified to provide virtual port ~~minoring~~ mirroring by forward- Signed and Sealed this  
Third Day of April, 2012

David J. Kappos  
*Director of the United States Patent and Trademark Office*